July 29, 1969 H. DAVIES ETAL 3,458,156
TAPE LACING MECHANISM
Filed Oct. 13, 1966
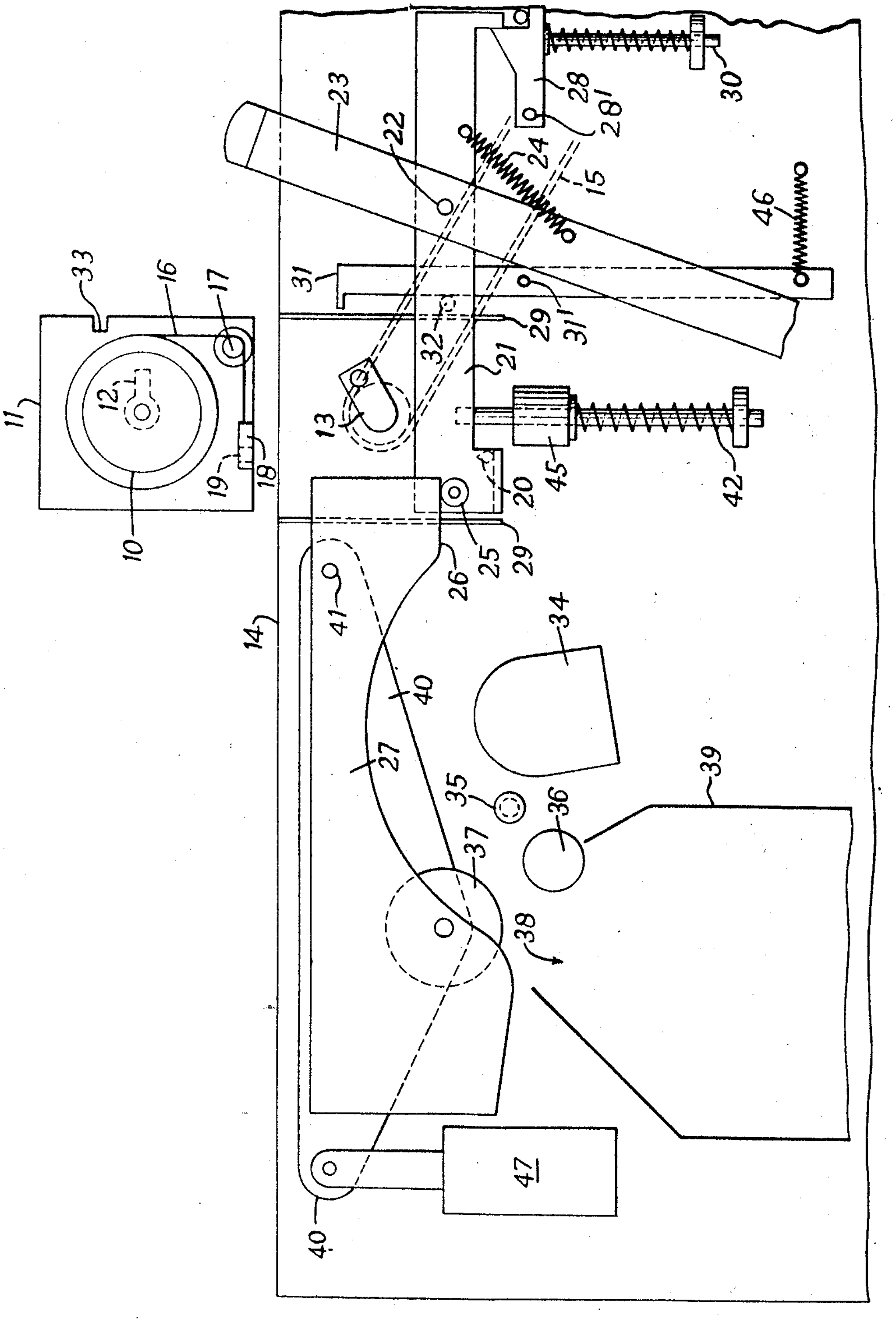

United States Patent Office
3,458,156
Patented July 29, 1969

3,458,156
TAPE LACING MECHANISM
Henry Davies, New Malden, Surrey, Henry J. Houlgate, Eltham, London, Geoffrey W. H. Larkby, Bexhill-on-Sea, Sussex, and Derek Peat, Sunbury-on-Thames, Middlesex, England, assignors to The British Broadcasting Corporation, London, England
Filed Oct. 13, 1966, Ser. No. 586,453
Claims priority, application Great Britain, Oct. 15, 1965, 43,863/65
Int. Cl. G11b *15/66;* G03b *1/56*
U.S. Cl. 242—182 4 Claims

ABSTRACT OF THE DISCLOSURE

A lacing mechanism for tape recorders and replaying devices having a lacing bar adapted to engage the end of a tape and to convey the tape through suitable cam means to a point at, or beyond, the mouth of a store, the tape being then driven into the store by a capstan while the lacing bar remains outside the store.

The present invention relates to tape recording or replaying devices in which intelligence, for example sound, is recorded upon a tape.

For the purpose of the following description only magnetic recording on tape is referred to but it is to be understood that other forms of recording, for example photographic, may be used. The word "tape" is intended to include any strip-like record.

For some purposes, as for example in sound and television broadcasting, it is necessary to reproduce simultaneously or in sequence a number of comparatively short sound recordings, for example to obtain sound effects. It is an essential part of such operations that it be possible to begin at a precisely chosen place in each recording at the precise point of time required by the associated action. The present invention has for its principal object the provision of improved means for doing this.

According to the present invention, there is provided a tape recording or replaying device comprising means for detachably accommodating a tape-bearing spool, a lacing member having means to engage the free end of a tape on said spool, the lacing member being movable to transport said tape end beyond a capstan, and to near the mouth of a store arranged to receive the tape drawn from the spool by the capstan while the said tape end remains in engagement with the lacing member.

The lacing member may be guided by a cam in such a manner that the tape is laced between the capstan and a pinch wheel, and is driven when the pinch wheel presses the tape against the capstan.

According to a preferred embodiment of the present invention, the spools are mounted within interchangeable cartridges or cassettes. When one of these cassettes is inserted in an appropriate slot in a recording and/or replay machine, it latches into position. Then, either by automatic means, or by the manual operation of the lacing member the end of the tape is drawn out from the cassette and laced so as to lie between the capstan and a pinch wheel adapted to drive the tape in known manner. It is an important feature of this machine that when the lacing operation is completed the tape lies stationary with the beginning of any recording on it so placed with respect to a magnetic reproducing head that, on engagement of the pinch wheel with the capstan, the tape is drawn from the cassette over the head, coming up to speed almost instantly at the beginning of the recording. It is also an important feature that, when the cassette is engaged in the machine, torque is continuously applied to the spool in it so that, or disengagement of the pinch wheel from the capstan, the tape rapidly rewinds into the cassette until it regains the position where, on engagement of the pinch wheel and capstan, reproduction starts instantly at the beginning of the recording. Means of release are provided by which the whole of the tape is first wound back into the cassette and the cassette is then released or ejected from the machine so that it may be replaced by another.

With this machine any one of an indefinitely large number of recordings can be inserted and reproduction from the starting point of each can be had virtually instantly on the operating of a control, e.g. a push button. On the release of the button the tape rapidly returns to its initial position so that replay from the same starting point can be repeated a few seconds later and so on indefinitely. By using the release means, one recording may be replaced by another with a delay of only a few seconds.

In some applications a number of such machines are assembled together to enable a number of instantaneous changes from one recording to another to be made in succession and means are provided by which one or more of the machines can record as well as reproduce. In this way cassettes containing blank tape can readily be "loaded" with recorded material from other sources or with any sequence or superpositioning of reproductions from cassettes inserted in the other machines.

The invention will be described, by way of example, with reference to the accompanying drawing which is a schematic representation of an embodiment using manual lacing.

Tape coated with magnetic material is carried on a spool 10 rotatably mounted in a cartridge or cassette 11. The inner end of the tape is fixed to the axle of the spool which extends through the side of the cassette 11 and has a dog 12 fixed thereto. This dog is adapted, when the cassette is inserted and in its operative position, to engage with and be driven by a dog 13 rotatably mounted on the base 14 of the apparatus, the latter dog being driven, for example through a belt 15, by means of an electric or spring motor which is not shown.

The tape 16 from the spool 10 passes over a guide pin 17 and terminates in a leader 18 having a hole 19 therein adapted to be engaged by a projection 20 on a lacing bar 21 when the cassette 11 is in operative position in the apparatus.

The lacing bar 21 is pivoted at 22 upon a lacing lever 23 the lower end of which is pivotally mounted, although this is not shown. A spring 24 holds the lacing bar 21 in a position in which a cam follower 25, mounted thereon, engages the surface 26 of a cam 27 fixed to the base 14. An interlock latch 28, pivotally mounted at 28' on the base, normally prevents movement of the lacing bar 21 to the left.

When a cassette 11 is inserted downwards into the apparatus, between two guide ribs 29 fixed to the base, it comes to rest against a spring ejector 42. A first downward pressure exerted on the cassette partially compresses the spring ejector 42, permitting the hole 19 in the leader 18 to surround and engage the projection 20 on the lacing bar 21 and the two dogs 12 and 13 to move into mating relation. Continued downward pressure exerted on the cassette further compresses the spring ejector 42 allowing the cassette to go slightly beyond its normal working position, until it is stopped by the spring ejector housing 45, the left hand end of the lacing bar 21 lying tilted downwards about the pivot 22 and the right-hand end of the lacing bar 21 being released from the catch 28. A spring 46 on a latch lever 31 rocks this lever 31 about a pivot 31' and moves the top of the latch lever 31 to the left, thereby exerting pressure on a pin 32 attached to the lacing bar 21 and moving the lacing bar 21 to the left, the latch lever 31 entering a recess 33 in the cassette.

ing simultaneously or in sequence may be recorded into one or more such units.

What is claimed is:

1. A device employing a record in the form of a tape, said device comprising means for detachably accommodating a tape bearing spool, a lacing bar, a cam follower on said lacing bar, tape-engaging means on said lacing bar for engaging the free end of the tape on said spool, a capstan for driving said tape, a cam having a surface located to be engaged by said cam follower, a store to receive said tape through a mouth thereof, and means for supporting said lacing bar for movement with said cam follower tracking said cam surface to transport said tape end beyond on said capstan and adjacent the mouth of said store into a position in which said tape can fall into said store while said tape end remains in engagement with said lacing bar outside said store.

2. A device according to claim 1, further comprising a pinch wheel movable toward and away from said capstan, said capstan driving said tape when the pinch wheel is moved toward said capstan.

3. A device according to claim 1, comprising means for guiding said spool into an operative position in said device, said spool when in said operative position being located with said free end of the tape in engagement with said tape-engaging means, driven means on said spool and driving means adapted to engage said driven means when said spool is in said operative position and to apply to said spool a torque tending to draw said tape on to said spool.

4. A device employing a record in the form of a tape, said device comprising means for detachably accommodating a tape-bearing spool, a lacing member, tape-engaging means on said lacing member for engaging the free end of the tape on said spool, a capstan for driving said tape, a store to receive said tape through a mouth thereof, means for supporting said lacing member for movement to transport said tape-engaging means and engaged tape end beyond said capstan and adjacent the mouth of said store into a position in which said tape, between said tape-engaging means and said capstan, can fall into said store while said tape end remains in engagement with said tape-engaging means outside said store.

References Cited

UNITED STATES PATENTS

| | | |
|---|---|---|
| 2,345,869 | 4/1944 | Edwards. |
| 3,058,683 | 10/1962 | Wahlstrom. |
| 3,153,516 | 10/1964 | De Loof et al. |
| 3,195,792 | 7/1965 | Louzil. |

GEORGE F. MAUTZ, Primary Examiner

U.S. Cl. X.R.

226—92; 242—195, 209